(12) United States Patent
Browne et al.

(10) Patent No.: US 7,638,921 B2
(45) Date of Patent: Dec. 29, 2009

(54) ACTIVE MATERIAL NODE BASED RECONFIGURABLE STRUCTURES

(75) Inventors: Alan L. Browne, Grosse Pointe, MI (US); Nilesh D. Mankame, Ann Arbor, MI (US); Nancy L. Johnson, Northville, MI (US)

(73) Assignee: GM Global Technology Operations, Inc, Detroit, MI (US)

( * ) Notice: Subject to any disclaimer, the term of this patent is extended or adjusted under 35 U.S.C. 154(b) by 521 days.

(21) Appl. No.: 11/357,901

(22) Filed: Feb. 17, 2006

(65) Prior Publication Data
US 2006/0186126 A1    Aug. 24, 2006

Related U.S. Application Data

(60) Provisional application No. 60/654,309, filed on Feb. 19, 2005.

(51) Int. Cl.
*H02N 10/00* (2006.01)
*H02N 2/00* (2006.01)
*H01L 41/00* (2006.01)

(52) U.S. Cl. .................. 310/307; 310/311; 310/328

(58) Field of Classification Search .......... 310/307, 310/311, 316.01, 316.02, 323.01, 323.02, 310/328
See application file for complete search history.

(56) References Cited

U.S. PATENT DOCUMENTS

| | | | | |
|---|---|---|---|---|
| 2,073,062 A | * | 3/1937 | Henninger, Jr. | 40/442 |
| 3,696,259 A | * | 10/1972 | Mori et al. | 310/323.01 |
| 4,349,183 A | * | 9/1982 | Wirt et al. | 267/160 |
| 4,964,062 A | * | 10/1990 | Ubhayakar et al. | 700/249 |
| 5,129,279 A | * | 7/1992 | Rennex | 74/490.05 |
| 5,726,519 A | * | 3/1998 | Gonnard et al. | 310/323.04 |
| 6,046,531 A | * | 4/2000 | Kikuchi et al. | 310/367 |
| 6,051,909 A | * | 4/2000 | Shinke et al. | 310/316.01 |
| 6,367,251 B1 | * | 4/2002 | Wood | 60/528 |
| 6,545,384 B1 | | 4/2003 | Pelrine et al. | |
| 6,555,945 B1 | | 4/2003 | Baughman et al. | |

(Continued)

FOREIGN PATENT DOCUMENTS

JP    58-145502    *    8/1983    ............... 310/311

(Continued)

OTHER PUBLICATIONS

Notification of Transmittal of the International Search Report and the Written Opinion of the International Searching Authority, or the Declaration, mailing date Oct. 2, 2007.

*Primary Examiner*—Thomas M Dougherty

(57) ABSTRACT

Reconfigurable structures include at least one hub, a plurality of arms attached to and extending from the at least one hub, wherein at least a portion of the arm and/or hub defines a node and is formed of an active material. The active material is adapted to change at least one attribute in response to an activation signal, wherein the change in the at least one attribute changes a modulus property, a shape orientation, or a combination of the modulus property change and the shape orientation change to the active material portion. The plurality of arms and at least one hub can form a reconfigurable opening for attaching and releasing a member. Alternatively, the plurality of arms and/or hub can further include a connector for attaching an additional structure. Also disclosed herein are methods for selectively reconfiguring a structure.

16 Claims, 2 Drawing Sheets

U.S. PATENT DOCUMENTS

| | | | |
|---|---|---|---|
| 6,707,232 B2 * | 3/2004 | Iino et al. | 310/323.02 |
| 6,992,422 B2 * | 1/2006 | Heaton et al. | 310/331 |
| 7,411,332 B2 * | 8/2008 | Kornbluh et al. | 310/311 |
| 2006/0030921 A1 * | 2/2006 | Chu | 623/1.11 |

FOREIGN PATENT DOCUMENTS

| | | | | |
|---|---|---|---|---|
| JP | 63-294279 | * | 11/1988 | 310/311 |
| JP | 63-294280 | * | 11/1988 | |
| JP | 3-159581 | * | 7/1991 | |

* cited by examiner

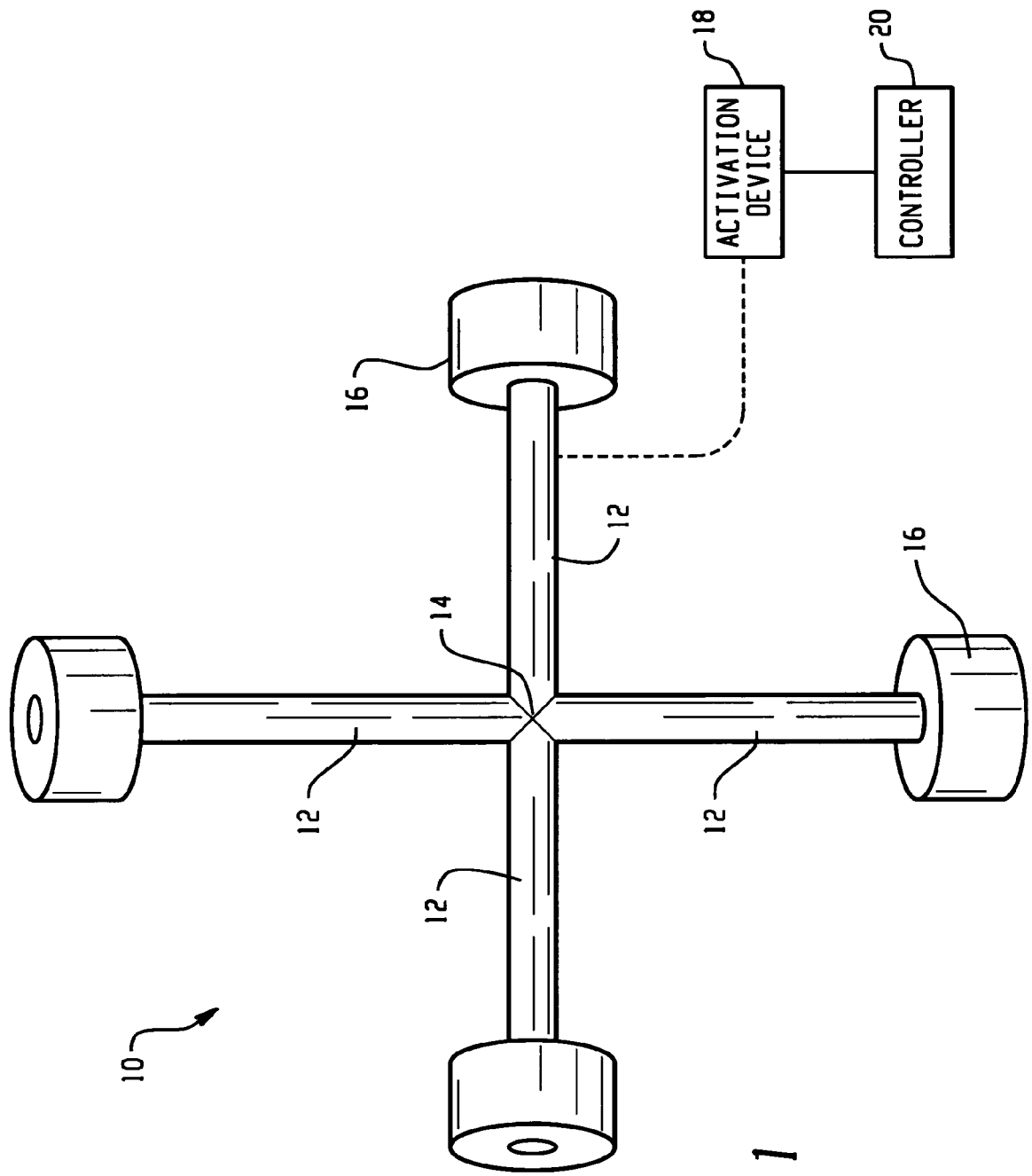

ACTIVE MATERIAL NODE BASED RECONFIGURABLE STRUCTURES

CROSS REFERENCE TO RELATED APPLICATIONS

The present application claims the benefit of U.S. Provisional Patent Application No. 60/654,309 filed on Feb. 19, 2005, incorporated herein by reference in its entirety.

BACKGROUND

The present disclosure generally relates to active material node based reconfigurable structures.

BRIEF SUMMARY

Disclosed herein active material node based reconfigurable structures. In one embodiment, the reconfigurable structure comprises at least one hub; a plurality of arms attached to and extending from the at least one hub, wherein at least a portion of the hub and/or arm defines a node and is formed of an active material adapted to change at least one attribute in response to an activation signal, wherein the change in the at least one attribute changes a modulus property, a shape orientation, or a combination of the modulus property change and the shape orientation change to the active material portion; an activation device in operative communication with the active material adapted to provide the activation signal; and a controller in operative communication with the activation device. It is to be understood that the arms can take on various geometrical cross sectional shapes, including but not limited to rods, strips (both thick and thin), and sheets (both thick and thin) and that their connections at the hubs can take the geometrical consistent form of holes, slots, and the like.

In another embodiment, a method for selectively reconfiguring a structure, comprises applying an activation signal to a node of a reconfigurable structure comprising a plurality of arms fixedly attached to a hub, wherein the node comprises at least a portion of the hub and/or arm and is formed of an active material; and changing a selected one of a modulus property, a shape orientation, and a combination of the modulus property and the shape orientation to the node.

The above described and other features are exemplified by the following figures and detailed description.

BRIEF DESCRIPTION OF THE DRAWINGS

Referring now to the figures, which are exemplary embodiments and wherein like elements are numbered alike:

FIG. 1 schematically illustrates a reconfigurable structure in accordance with one embodiment of the present disclosure;

DETAILED DESCRIPTION

Figure 3:
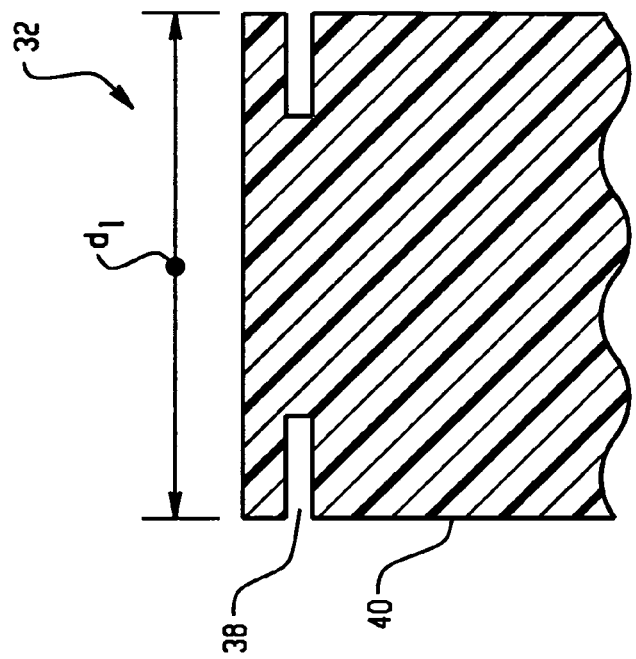
FIG. 3 illustrates a sectional view of a structural element.

Disclosed herein are active material node based reconfigurable structures, wherein the modulus or shape of one or more selected nodes can be reversibly changed by application of an appropriate field. In this manner, the structure can be reconfigured on demand and/or the stiffness of the structure can be altered. The reconfigurable structure can be multi-dimensional and can also function as a socket for on-demand selective connection and/or disconnection of additional structures. As will be described in greater detail below, the various nodes can be selectively activated and deactivated to accommodate a variety of applications.

The term "active material" as used herein refers to several different classes of materials, all of which exhibit a change in at least one attribute such as dimension, shape, and/or elastic modulus when subjected to at least one of many different types of applied activation signals, examples of such signals being thermal, electrical, magnetic, mechanical, pneumatic, and the like. One class of active materials is shape memory materials. These materials exhibit a shape memory effect. Specifically, after being deformed pseudoplastically, they can be restored to their original shape in response to the activation signal. Suitable shape memory materials include, without limitation, shape memory alloys (SMAs), magnetic shape memory alloys (MSMAs), and shape memory polymers (SMPs). A second class of active materials can be considered as those that exhibit a change in at least one attribute when subjected to an applied activation signal but revert back to their original state upon removal of the applied activation signal. Active materials in this category include, but are not limited to, piezoelectric materials, electroactive polymers (EAPs), magnetorheological fluids and elastomers (MRs), electrorheological fluids (ERs), baroplastics, composites of one or more of the foregoing materials with non-active materials, combinations comprising at least one of the foregoing materials, and the like.

Of the above noted active materials, the SMAs, MSMAs, EAPs, and to a lesser degree MR elastomers can develop a measurable blocking force upon application of the appropriate activation signal, thereby providing an added functionality of a self actuatable, and in some instances, reversible reconfigurable structure. In contrast, active materials such as the SMPs, the baroplastics, and the MR and ER fluids provide little or no actuating force. However, these materials do provide the capability of locking the nodes in position and in doing so can lock in the internal stresses that would otherwise act to reconfigure the structure. More particularly, the SMPs and baroplastics can serve to lock the structure geometry when not activated whereas the MR and ER fluid would lock the structure when activated. One of skill in the art would readily appreciate the unique properties inherent and specific to the different active materials and readily apply this knowledge to the particular reconfigurable structure and application in view of the present disclosure.

FIG. 1 illustrates an exemplary reconfigurable structure generally designated by reference numeral 10. The reconfigurable structure 10 includes a plurality of arms 12 radially disposed from a central hub 14. Although four arms are shown, more or less arms can be employed. Likewise, each arm can have the same or different shapes that are not necessarily linear as shown. Moreover, although the reconfigurable structure 10 is shown as a substantially planar simple structure, complex geometries are also contemplated for some applications. For example, the structure can include a plurality of hubs or be connected to additional reconfigurable structures and form a three-dimensional icosahedral configuration. As such, the reconfigurable structure is not intended to be limited to any particular shape or form.

Arm connectors 16 are disposed at each end of the arms 12 for connecting the reconfigurable structure to another component or another reconfigurable structure. The connectors 16 can take any shape or form suitable for attachment to an additional structure. The additional structure can be reconfigurable or non-reconfigurable and take any shape or form. For illustrative purposes, the arms 12 are formed of a shape memory polymer and define the node (though it should be equally understood that there are embodiments comprehended in which the hubs could comprise the nodes and/or in which both the hubs and at least portion of the arms comprise the nodes). An activation device 18 and a controller 20 are in operative communication with the active material tom provide selective activation with an appropriate activation signal. For example, in the example given, the activation signal includes heating one or more of the arms (nodes) to above the Tg for at least one of the segments defining the shape memory polymer reduces the Young's modulus (E) and shear modulus (G) properties, and hence changes the bending and torsional stiffness properties of the reconfigurable structure. In its heated form, the configuration of the arm(s) can be changed easily, and the new position can be set by cooling below the Tg while holding the new configuration (thereby locking in any internal stresses). Once the arm has cooled below Tg, it regains its earlier E and G, and hence its original stiffness is restored but the structure itself is newly configured.

In one embodiment, the selected nodes are formed of an active material that is temporarily "softened" by application of an applied field to allow the structure to be reconfigured by an applied force or an internal stress. The applied force or internal stress could take various forms, e.g., naturally occurring and arbitrary occurring. Naturally occurring applied forces or internal stresses can occur from the environment in which the reconfigurable structure 10 is disposed whereas arbitrary applied force or stresses can occur through deliberate externally applied actions so as to alter the geometry of the structure in a desired or arbitrary manner. The internal or external stresses that change the geometry are sustained to hold the changed geometry until it is set or locked in. The applied field would then be removed while the nodes remain in the reconfigured configuration. Other embodiments include controlling the stiffness properties as opposed to altering the geometry of the reconfigurable structure. In still another embodiment, the nodes are deformed upon receipt of the activation. This includes, for example, restoring a structure to its original/starting geometry subsequent to a distortion in the shape of the structure in which the distortion was due exclusively to forced "plastic" changes in the geometry of the nodes.

In another embodiment, hybrid nodes can be formed from combinations of different active materials, which can then be "softened". For example, the application of a first field selectively activates ("softens") a first active material. The geometry of the node is then altered by the application of a second field, which activates the second ("actuator") active material. In this manner, the modulus behavior and shape orientation of the structure can be tailored to the specific application in which the reconfigurable structure is used.

Composites can extend this functionality even further. A spring steel insert (not shown) corresponding to the base position can serve to restore the original configuration if the connector is heated above Tg without the need for an external load. The insert stiffness (bending and/or torsional properties) is preferably selected such that it is less than the stiffness of the SMP arm below Tg and more than it above Tg.

In another embodiment, a pre-strained martensite phase SMA insert corresponding to the base configuration is used. An activation signal can then be used for resetting the configuration after use and much larger changes in configuration can be accommodated. Antagonistic SMA actuation can also be used to effect and control the change in configuration of the connector remotely, thereby yielding compact, self-actuated, reconfigurable connectors.

In another embodiment, an SMA insert with stress induced phase change to martensitic phase, i.e., an SMA that is strained superelastically is used in combination with SMP at a node. The SMP locks in the superelastic strain in the SMA which can be recovered resetting the configuration by heating and thus softening the SMP.

Advantageously, such reconfigurable structures may be used to locally change the configuration (e.g., uncoordinated configuration changes at one or more connectors in a truss-like structure) or globally change the configuration (coordinated changes in configuration over two or more connectors) of the structure in which they are used without the need for disassembly. This can be very useful for rapid modeling. The reconfigurability also enables the use of one basic connector in many related applications or styles, with the exact connector geometry being adjusted during assembly to suit the style or application. This reduces the number of disparate items needed to assemble one or more work pieces.

In another embodiment, the reconfigurable structure provides a socket-like connector. For example, consider the node taking the form of a 3-dimensional sphere, disc, cylinder, etc. of material, all or only portions of which may be active materials. Other elements of the structure would be connected to this node by inserting them into sockets defined by the geometry of the node. In addition to all of the functions described above for the multiple arm connectors, the active materials could be so located and configured in the node so as to allow on-demand selective disconnection of structural elements from the node.

Figure 2:
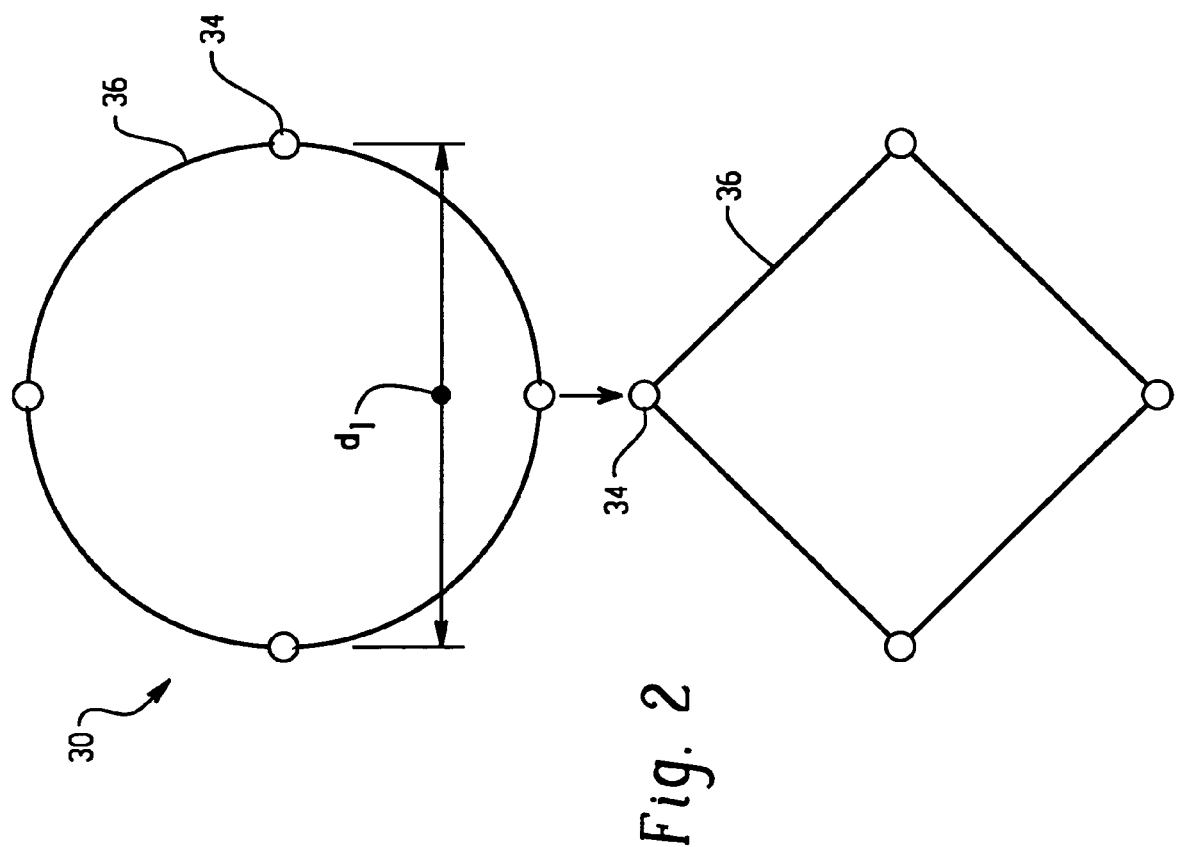
FIG. 2 schematically illustrates a reconfigurable structure in accordance with another embodiment of the present disclosure.

FIGS. 2 and 3 illustrate an exemplary reconfigurable structure 30 and structural element 32, respectively. The reconfigurable structure 30 is adapted to selectively engage and disengage the structural element 32. The reconfigurable structure 30 includes at least one a cage-like node structure, which is shown as having an original circular shape when not activated. The cage-like node structure includes a plurality of hubs 34 interconnected with arms 36 formed of the active material. Each arm 36 has an arcuate shape, thereby providing the cage-like structure with the circular shape. Using shape memory alloys as an example of the active material, activation of the shape memory alloy changes a shape orientation of the cage-like structure. The shape of the arms changes from the arcuate original shape to a substantially linear orientation upon activation. The shape change in the cage-like structure can be used to selectively engage or disengage the structural element 32, which has a diameter (dl) about the same as the diameter (dl) provided by the reconfigurable structure 30 when not activated. An annular recess 38 about a shaft 40 of the structural element 32 serves to provide a location that connectively locks the structural element with the reconfigurable structure 30 upon activation of active material nodes. Activation results in a smaller diameter (d2), thereby providing engagement.

By way of example, the reconfigurable structures can be employed in the automotive arts to tailor the geometry of a structure or body to selectively conform to an object, e.g., the reconfigurable structure can be in the form of, among others, a cup holder to hold cups of different sizes, a cargo holder to prevent luggage from tossing around in the trunk (e.g. via a scissors mechanism that uses these connectors to lock itself at any position), an adjustable height suspension system, and the like. However, it should be noted that the reconfigurable structures are intended to be limited to the automotive arts or shape and can find application in various fields where reconfigurability is desirable.

Shape memory polymers (SMPs) generally refer to a group of polymeric materials that demonstrate the ability to return to some previously defined shape when subjected to an appropriate thermal stimulus in the absence of any applied loads.

Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n-1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment at which it was deformed yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent of the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

Optionally, the SMP can be selected to provide stress-induced yielding, which may be used directly (i.e. without heating the SMP above its thermal transition temperature to 'soften' it) to make the panel conform to a given surface as may be desired for different applications. The maximum strain that the SMP can withstand in this case can, in some embodiments, be comparable to the case when the SMP is deformed above its thermal transition temperature, though the associated stress is much higher.

Although reference has been, and will further be, made to thermoresponsive SMPs, those skilled in the art in view of this disclosure will recognize that photoresponsive, moisture-responsive SMPs and SMPs activated by other methods may readily be used in addition to or substituted in place of thermoresponsive SMPs. For example, instead of using heat, a temporary shape may be set in a photoresponsive SMP by irradiating the photoresponsive SMP with light of a specific wavelength (while under load) effective to form specific crosslinks and then discontinuing the irradiation while still under load. To return to the original shape, the photoresponsive SMP may be irradiated with light of the same or a different specific wavelength (with the load removed) effective to cleave the specific crosslinks. Similarly, a temporary shape can be set in a moisture-responsive SMP by exposing specific functional groups or moieties to moisture (e.g., humidity, water, water vapor, or the like) effective to absorb a specific amount of moisture, applying a load or stress to the moisture-responsive SMP, and then removing the specific amount of moisture while still under load. To return to the original shape, the moisture-responsive SMP may be exposed to moisture (with the load removed).

Suitable shape memory polymers, regardless of the particular type of SMP, can be thermoplastics, thermosets-thermoplastic copolymers, interpenetrating networks, semi-interpenetrating networks, or mixed networks. The SMP "units" or "segments" can be a single polymer or a blend of polymers. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly (amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly (lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly (octadecyl vinyl ether), poly (ethylene vinyl acetate), polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

As will be appreciated by those skilled in the art, conducting polymerization of different segments using a blowing agent can form a shape memory polymer foam, for example, as may be desired for some applications. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N, N' dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen, and the like.

Shape memory alloys are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). It should be noted that the above-mentioned transition temperatures are functions of the stress experienced by the SMA sample. Specifically, these temperatures increase with increasing stress. In view of the foregoing properties, deformation of the shape memory alloy is preferably at or below the austenite transition temperature (at or below $A_s$). Subsequent heating above the austenite transition temperature causes the deformed shape memory material sample to revert back to its permanent shape. Thus, a suitable activation signal for use with shape memory alloys is a thermal activation signal having a magnitude that is sufficient to cause transformations between the martensite and austenite phases.

The temperature at which the shape memory alloy remembers its high temperature form when heated can be adjusted by slight changes in the composition of the alloy and through thermo-mechanical processing. In nickel-titanium shape memory alloys, for example, it can be changed from above about 100° C. to below about −100° C. The shape recovery process can occur over a range of just a few degrees or exhibit a more gradual recovery. The start or finish of the transformation can be controlled to within a degree or two depending on the desired application and alloy composition. The mechanical properties of the shape memory alloy vary greatly over the temperature range spanning their transformation, typically providing shape memory effect, superelastic effect, and high damping capacity. For example, in the martensite phase a lower elastic modulus than in the austenite phase is observed. Shape memory alloys in the martensite phase can undergo large deformations by realigning the crystal structure arrangement with the applied stress. As will be described in greater detail below, the material will retain this shape after the stress is removed.

Suitable shape memory alloy materials for use in the panel include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends on the temperature range where the component will operate.

Aside from strict shape recovery, any active material that can be made to linearly expand or contract may be used to produce a bending actuator by combining this active material with a non-active elastic member. In the literature, this is generally referred to as a unimorph actuator. If both components are made of the same material but made to deform in opposite directions, the material becomes a bimorph. For on demand applications, some materials may be appropriate themselves for the outer surface of the vehicle control mechanism.

Bending to the left or right can be induced by using the at least one active material that expands or contracts, respectively. In the bimorph either direction can also be achieved depending on orientation of the at least one active material layers. An unimorph may be created by using a shape memory alloy, conducting polymer, electrostrictive polymer, or other axially straining material, along with an elastic component that causes bending couple to be created. The elastic member can belong to many material classes including metallic alloys, polymers, and ceramics. Preferred materials are those which exhibit large elastic strain limits, and those which can efficiently store mechanical energy. Secondary considerations include those which may be easily bonded to the at least one active material, have properties that are acceptable in the working temperature range, and have adequate toughness to survive repeated actuation. A bimorph may be created for any material in which the material may be driven into both extension and compression depending on the driving signal. Ionic polymer actuators such as IPMC and conducting polymers intrinsically exhibit this effect due to the transport of ionic species that cause swelling across a membrane. Therefore, these materials are preferably used for this type of deformation.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, more preferably, reduced carbonyl iron.

The particle size should be selected so that the particles exhibit multi-domain domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred. p Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Advantageously, the reconfigurable structure can be used to tweak models (e.g. vehicle body mock ups) quickly during the conceptual design phase. Moreover, using the above ability to the stiffness of a body (in a structure or a mechanism) can be locally change (e.g. at a node) and/or globally by simultaneous, and possibly, coordinated changes in the stiffness of two or more nodes. Still further, the reconfigurable structure can reduce the number if disparate connectors needed to assemble a work piece. Instead of having n different connectors, we can have one reconfigurable connector that can be reconfigured just prior to or during the assembly operation to suit the current work piece.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A reconfigurable connecting structure adapted for facilitating the interconnection and disconnection of pluralities of parts presenting differing configurations, said structure comprising:

at least one hub;

a plurality of arms presenting distal connectors, and attached to and extending from said at least one hub, wherein at least a portion of the arms and/or the hub are cooperatively configured to interconnect a first plurality of parts, so as to define a node, and is formed of an active material adapted to change at least one attribute of the arms or hub in response to an activation signal, the change in the at least one attribute changes a modulus property, a shape orientation, or a combination thereof, and the node is configured such that the change enables interconnection of a second plurality of parts differing in geometric configuration or relative positioning from the first plurality of parts;

an activation device in operative communication with the active material and operable to provide the activation signal; and a controller in operative communication with the activation device.

2. The reconfigurable structure of claim 1, wherein at least one of the plurality of arms and/or hub further comprises a connector for attachment to a second reconfigurable structure.

3. The reconfigurable structure of claim 1, wherein the at least one hub and the plurality of arms are configured to form a three dimensional structure.

4. The reconfigurable structure of claim 1, wherein the node can be selectively positioned at least one time by application of an applied force or internal stress to the active material.

5. The reconfigurable structure of claim 1, wherein the active material comprises a shape memory polymer, a baroplastic, a shape memory alloy, a magnetic shape memory alloy, an electroactive polymer, a magnetorheological elastomer, a magnetorheological fluid, an electrorheological fluid, electrorheological elastomer, an ionic polymer metal composite, or a combination comprising at least one of the foregoing active materials.

6. The reconfigurable structure of claim 1, wherein the plurality of arms and/or the at least one hub are reconfigurable, so as to cooperatively form a first geometric shape configured to enable attachment to a member, and a second geometric shape configured to release the member once attached.

7. The reconfigurable structure of claim 1, wherein the activation signal is a selected one of a thermal signal, a magnetic signal, a mechanical signal, a chemical signal, an optical signal, and a combination comprising at least one of the foregoing signals.

8. The reconfigurable structure of claim 1, wherein the active material comprises a composite of two or more active materials.

9. The reconfigurable structure of claim 1, wherein the controller is programmed to signal the activation device to provide the activation signal in response to information obtained from one or more sensors that monitor at least one of a state of the node, a body of which the node is a part, and an operating environment of the structure.

10. A method for selectively reconfiguring a connecting structure presenting a plurality of arms fixedly attached to a hub, wherein the arms and hub comprise an active material, and at least a portion of the arms and hub are cooperatively configured to interconnect plural parts so as to form a node, said method comprising:

applying an activation signal to the node, so as to change a selected one of a modulus property, a shape orientation, and a combination of the modulus property and shape orientation the;

applying a force, so as to reconfigure, the node; and removing the signal from the node, so as to reverse the change.

11. The method of claim 10, wherein applying the activation signal comprises applying a selected one of a thermal signal, a magnetic signal, a mechanical signal, a chemical signal, an optical signal, and a combination comprising at least one of the foregoing signals to the node.

12. The method of claim 10, wherein the active material comprises a shape memory polymer, a baroplastic, a shape memory alloy, a magnetic shape memory alloy, an electroactive polymer, a magnetorheological elastomer, a magnetorheological fluid, an electrorheological fluid, electrorheological elastomer, an ionic polymer metal composite, or a combination comprising at least one of the foregoing active materials.

13. The method of claim 10, wherein the active material comprises a composite of two or more active materials.

14. The method of claim 10, wherein the plurality of arms and the at least one hub form a reconfigurable socket for attaching and releasing a member.

15. The method of claim 10, wherein applying the activation signal to the node locally changes the reconfigurable structure.

16. The method of claim 10, wherein applying the activation signal to the node globally changes the reconfigurable structure.

* * * * *